US010800118B2

(12) United States Patent
Iwamura et al.

(10) Patent No.: US 10,800,118 B2
(45) Date of Patent: Oct. 13, 2020

(54) METHOD OF MANUFACTURING TIRE PRODUCT

(71) Applicant: Sumitomo Rubber Industries, Ltd., Kobe-shi, Hyogo (JP)

(72) Inventors: Wako Iwamura, Kobe (JP); Kiyotaka Nishio, Kobe (JP); Makoto Igarashi, Kobe (JP); Makoto Sugiya, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 251 days.

(21) Appl. No.: 15/679,537

(22) Filed: Aug. 17, 2017

(65) Prior Publication Data

US 2018/0065330 A1 Mar. 8, 2018

(30) Foreign Application Priority Data

Sep. 8, 2016 (JP) .................................. 2016-175867

(51) Int. Cl.
| | |
|---|---|
| *B29D 30/00* | (2006.01) |
| *B29D 30/10* | (2006.01) |
| *B29D 30/02* | (2006.01) |
| *B60C 7/10* | (2006.01) |

(52) U.S. Cl.
CPC ......... *B29D 30/0016* (2013.01); *B29D 30/10* (2013.01); *B29D 30/005* (2013.01);
(Continued)

(58) Field of Classification Search
CPC .. B29D 30/0016; B29D 30/005; B29D 30/02; B29D 30/0601; B29D 30/0603;
(Continued)

(56) References Cited

U.S. PATENT DOCUMENTS

| | | | | |
|---|---|---|---|---|
| 3,945,866 A | * | 3/1976 | Rudder | B29D 30/20 |
| | | | | 156/126 |
| 7,780,579 B2 | * | 8/2010 | Mueller | G01G 7/04 |
| | | | | 482/57 |

(Continued)

FOREIGN PATENT DOCUMENTS

| | | | | |
|---|---|---|---|---|
| DE | 4021704 A1 | * | 1/1992 | ........... G01G 19/025 |
| EP | 3 159 182 A1 | | 4/2017 | |

(Continued)

OTHER PUBLICATIONS

Bahn Hermann, DE-4021704-A1, machine translation. (Year: 1992).*

*Primary Examiner* — Robert C Dye
*Assistant Examiner* — Sedef E Paquette
(74) *Attorney, Agent, or Firm* — Birch, Stewart, Kolasch & Birch, LLP (57) ABSTRACT

A method of manufacturing a tire product comprising: a step of preparing a core-assembly 4 of a rigid core 2 and a rubber member 3 formed on the rigid core 2, wherein the rigid core 2 is attached to a spindle device 7, and the rubber member 3 is to be vulcanization-molded, and constitutes all or a portion of a green tire, a step of conveying the core-assembly 4 from the spindle device 7 into a mold 50, and a step of vulcanization-molding the rubber member 3 on the rigid core 2 in the mold 50. The conveying of the core-assembly includes obtaining the weight of the rubber member 3 included in the core-assembly 4.

3 Claims, 5 Drawing Sheets

(52) U.S. Cl.
CPC ...... *B29D 30/02* (2013.01); *B29D 2030/0022* (2013.01); *B29D 2030/0038* (2013.01); *B29D 2030/105* (2013.01); *B60C 7/102* (2013.01)

(58) Field of Classification Search
CPC .... B29D 30/0661; B29D 30/10; B29D 30/20; B29D 30/2607; B29D 2030/0022; B29D 2030/0038; B29D 2030/0066; B29D 2030/0634; B29D 2030/0635; B29D 2030/0637; B29D 2030/0638; B29D 2030/105; B29D 2030/0647; B60C 7/102; G01G 1/00; G01G 1/26; G01G 19/00; G01G 19/02; G01G 19/025; G01G 17/00
USPC .................. 156/396, 111; 152/311; 264/40.4
See application file for complete search history.

(56) References Cited

U.S. PATENT DOCUMENTS

| | | | | |
|---|---|---|---|---|
| 2008/0290539 A1* | 11/2008 | Bruschelli | .............. | B29D 30/06 264/40.4 |
| 2012/0228791 A1* | 9/2012 | Creasap | ............. | B29D 30/0601 264/40.4 |
| 2014/0332127 A1 | 11/2014 | Iwamura | | |

FOREIGN PATENT DOCUMENTS

| | | |
|---|---|---|
| JP | 2014-218132 A | 11/2014 |
| JP | 2016-7863 A | 1/2016 |

* cited by examiner

METHOD OF MANUFACTURING TIRE PRODUCT

TECHNICAL FIELD

The present invention relates to a method of manufacturing a tire product by the use of a rigid core, more particularly to a method of manufacturing a tread ring used in an airless tire.

BACKGROUND ART

Recently, there have been proposed an airless tire which supports a tire load by its structural elements unlike a pneumatic tire which supports a tire load by high pressure air filled therein. See the following Patent Documents 1 and 2.

Such airless tire comprises a tread ring corresponding to a tread portion of a pneumatic tire, a hub fixed to a vehicle axle, and spokes connecting between the tread ring and the hub and made of an elastic material such as elastomer and resin to provide a cushioning effect.

Such a tread ring is manufactured by the use of a metallic rigid core in stead of an inflatable bladder used in a conventional method of manufacturing a pneumatic tire.
The rigid core has an outer surface for shaping the inner surface of the tread ring to be molded.
The rigid core is attached to a spindle device for rotating the core. An end of a belt-shaped unvulcanized rubber member is attached to the outer surface of the rigid core. Then, the rigid core is rotated by the spindle device. Thereby, the rubber member is wound on the outer surface of the rigid core. Further, a textile member for reinforcing the tread ring is wound similarly. Thus, an assembly of the rigid core and the members wound thereon to be vulcanization-molded into the tread ring (hereinafter the "core-assembly") is prepared. The core-assembly is detached from the spindle device, and conveyed to a mold. Then, the rubber member in the core-assembly is vulcanization-molded by the use of the mold.

PRIOR ART DOCUMENTS

Patent Document 1: Japanese Patent Application Publication No. 2014-218132
Patent Document 2: Japanese Patent Application Publication No. 2016-007863

SUMMARY OF THE INVENTION

Problems to be Solved by the Invention

On the other hand, in a conventional tire vulcanization-molding method carried out using a bladder, the green tire disposed inside a mold is pressed against the inside of the mold by the inflated bladder disposed in the cavity of the green tire.

In the tread ring manufacturing method using a metallic rigid core, if the total volume of the rubber member to be vulcanization-molded which is included in the core-assembly is not sufficient for the volume of the cavity formed between the rigid core and the mold, in other words, the total volume does not reach to a range determined by the volume of the cavity, there is a possibility that problems occur. For example, the roundness of the tread ring (or tire) is decreased. The tread ring is not molded accurately because the member to be vulcanization-molded is not applied by a sufficient pressure and not pressed against the mold during vulcanization-molding.

In contrast, if the total volume exceeds the range determined by the volume of the cavity, there is a possibility that problems occur. For example, the mold is not completely closed, and defective molding occurs.

Therefore, in order to manufacture the tread ring accurately in dimensions and perfectly in the vulcanization, it is important to accurately control the total volume of the rubber member to be vulcanization-molded which is included in the core-assembly in relation to the volume of the cavity formed between the rigid core and the mold.

It is therefore, an object of the present invention to provide a method using a rigid core capable of manufacturing a tire product precisely without sacrificing the productivity.

According to the present invention, a method of manufacturing a tire product comprises the steps of:

preparing a core-assembly of a rigid core and a rubber member formed on the rigid core, wherein the rigid core is attached to a spindle device, and the rubber member is to be vulcanization-molded and constitutes all or a portion of a green tire, conveying the core-assembly from the spindle device to a mold, and vulcanization-molding the rubber member on the rigid core in the mold, wherein the conveying of the core-assembly includes
obtaining the weight of the rubber member included in the core-assembly.

Further, the method according to the present invention may include the following features (1)-(4):

(1) the conveying of the core-assembly further includes
determining whether the obtained weight is within a predetermined allowable range or not, and
adjusting the weight, when the obtained weight is outside the allowable range, by adding rubber to the rubber member when the weight is under the allowable range, or by removing rubber from the rubber member when the weight is over the allowable range;

(2) the conveying of the core-assembly is made by using a carriage, and
the obtaining of the weight is carried out on the carriage;

(3) the obtaining of the weight includes
determining the weight of the core-assembly by measuring a vertical force which a weighing device receives from the core-assembly, and
subtracting the weight of the rigid core from the weight of the core-assembly in order to obtain the weight of the rubber member;

(4) the obtaining of the weight includes
using a balancing device comprising a balance rod having a first end on which the core-assembly is loaded, and a second end to which a counterweight is attached so as to balance with the rigid core so that a weighing device measures the weight of the rubber member.

DESCRIPTION OF THE PREFERRED EMBODIMENTS

Embodiments of the present invention will now be described with reference to the accompanying drawings.

According to the present invention, the method of manufacturing a tire product is carried out by the use of a manufacturing apparatus.

Figure 1:
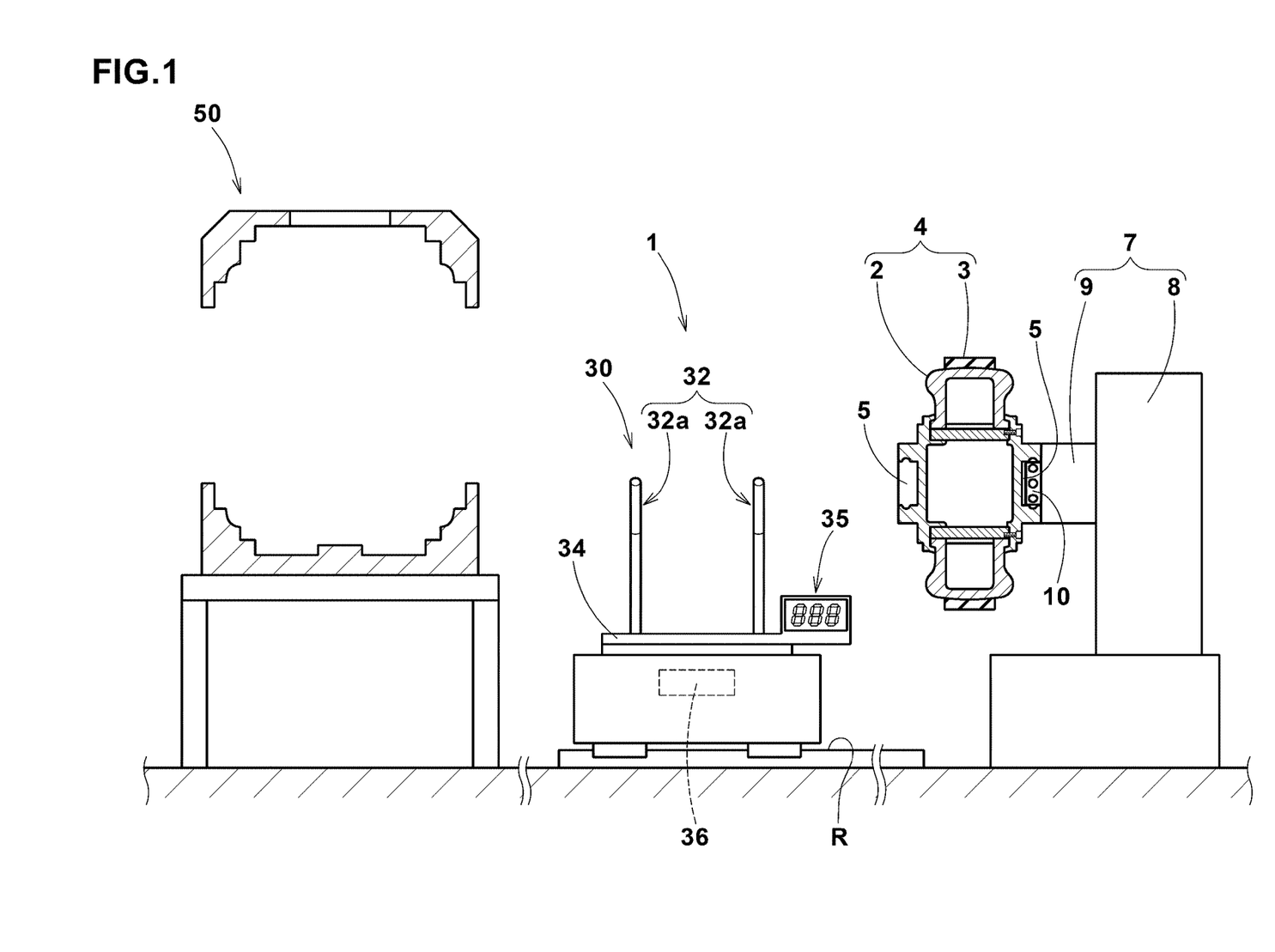
FIG. 1 is a side view of a manufacturing apparatus used in the method of manufacturing a tire product according to the present invention.
Figure 2:
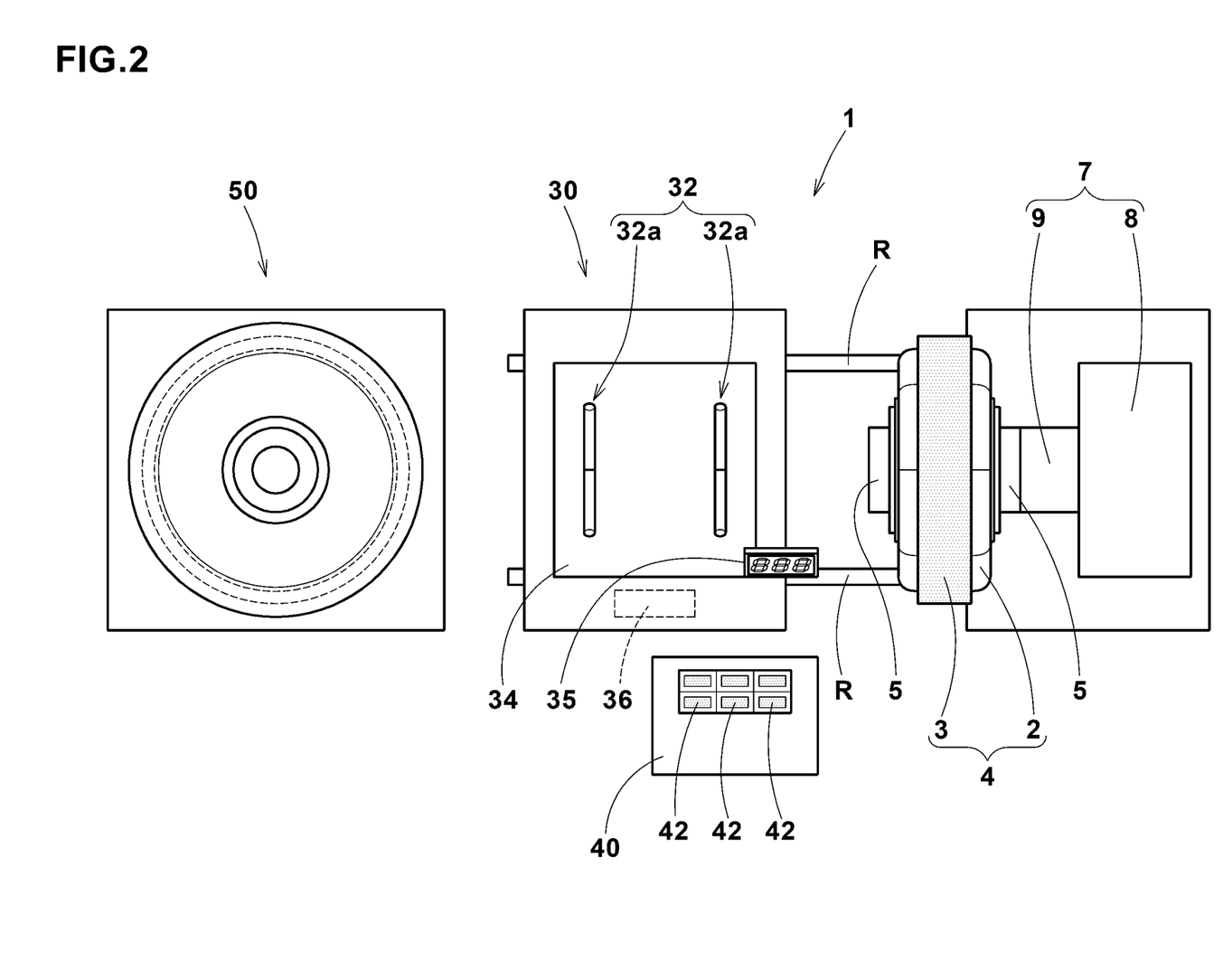
FIG. 2 is a plan view of the manufacturing apparatus.

FIGS. 1 and 2 show such manufacturing apparatus 1 as an example.

In the following method as an embodiment of present invention, a step of preparing a core-assembly, a step of conveying the core-assembly, and a step of vulcanization-molding the rubber member in the core-assembly, are carried out by the manufacturing apparatus 1.

In the step of preparing a core-assembly, a rubber member 3 to be vulcanization-molded is built up on the outside of the rigid core 2, and the core-assembly 4 of the rigid core 2 and the rubber member 3 thereon is prepared as shown in FIG. 1.

In this embodiment, the rubber member 3 to be vulcanization-molded is a ring-shaped tread ring used for an airless tire.

However, according to the present invention, the rubber member 3 to be vulcanization-molded can be a green tire itself as well as a component of an airless tire other than the tread ring. The manufacturing method according to the present invention is directed to a tire itself (regardless of pneumatic or non-pneumatic) and a tire component constituting a portion of such tire. Thus, the product to be manufactured is generally referred to as "tire product".

The rigid core 2 has an outer surface for molding an inner surface of the rubber member 3 to be vulcanization-molded. The rigid core 2 has a circumferentially continuous outer peripheral surface corresponding to an inner peripheral surface of the tread ring.

The rigid core 2 is composed of a plurality of segmented members made of a metallic material and circumferentially arranged into an annular shape.

After the rubber member 3 has been vulcanization-molded on the rigid core 2, the segmented members are disassembled and the rubber member is removed therefrom.

The rigid core 2 is provided on each side in the axial direction with a coupling portion 5 which protrudes axially outwardly. The axially outer end of the coupling portion 5 has a recess, and the coupling portion 5 is formed as a female connector of a male-and-female type one-touch joint for connecting two devices.

In the step of preparing a core-assembly, the rigid core 2 is attached to a spindle device 7.

The spindle device 7 comprises a frame 8 installed on a floor, and a support shaft 9 projecting horizontally from the frame 8. The support shaft 9 is provided at the end with a male connector of the above-mentioned male-and-female type one-touch joint. Namely, an insertion portion 10 for connecting with one of the coupling portions 5 of the rigid core 2 is provided at the end of the support shaft 9. By inserting the insertion portion 10 into the recess of the coupling portion 5 of the rigid core 2, the rigid core 2 is connected to the support shaft 9. When the rigid core 2 is attached to the spindle device 7 as above, the other coupling portion 5 is exposed and the recess is opened.

The spindle device 7 further comprises an electric motor (not shown) for rotating the support shaft 9. Thus, the rigid core 2 can be rotated around its axis of rotation while keeping the axis horizontal.

In the step of preparing a core-assembly in this embodiment, an end portion of a belt-shaped unvulcanized rubber member (not shown) is applied and fixed to the outer peripheral surface of the rigid core 2 in a stopped state. Then, the rigid core 2 is rotated by the spindle device 7. And, the belt-shaped unvulcanized rubber member having a predetermined length is circumferentially continuously wound or applied around the outer peripheral surface of the rigid core 2.

During the rigid core 2 is being rotated, the belt-shaped unvulcanized rubber member which is supplied to be wound, may be moved in the axial direction so that it is wound helically and/or wound into a plurality of plies or layers based on the cross sectional shape of the belt-shaped unvulcanized rubber member and/or the shape of the rubber member 3 to be vulcanization-molded.

Further, a textile member for reinforcement may be wound on or in the wound belt-shaped unvulcanized rubber member.

Thus, in the step of preparing core-assembly, there is prepared a core-assembly 4 of the rigid core 2 and the rubber member 3 for the tread ring formed thereon.

Figure 3:
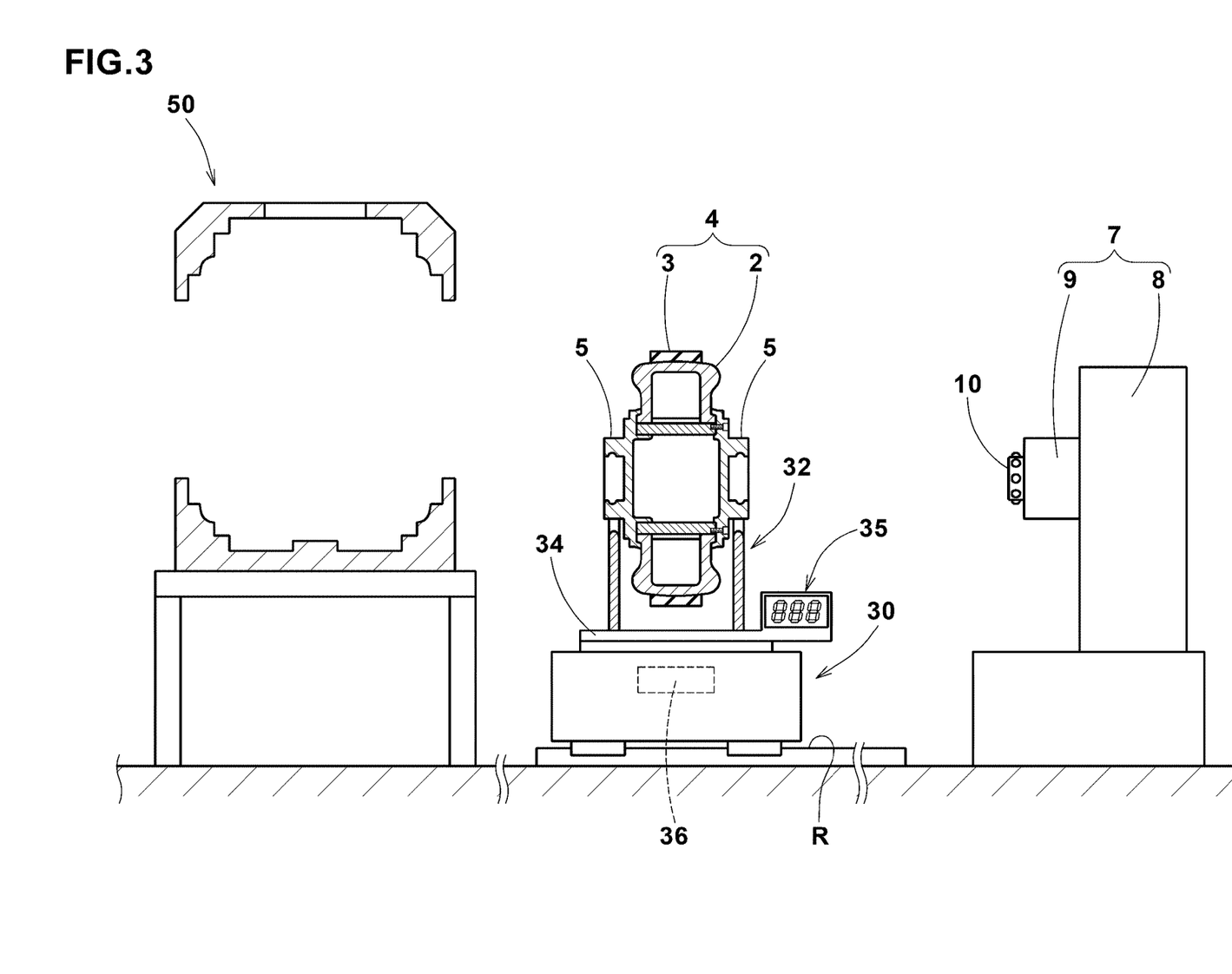
FIG. 3 is the side view of the manufacturing apparatus for explaining the step of conveying the core-assembly in an embodiment of the present invention.

In the step of conveying the core-assembly, the core-assembly 4 is removed from the spindle device 7 as shown in FIG. 3, and conveyed to a mold 50.

The conveying of the core-assembly 4 can be carried out in various ways. For example, using a crane or a carriage, the rigid core 2 is conveyed to the mold 50 in a state of being hanged from the crane, or a state of being placed on the carriage.

In this embodiment, as shown in FIGS. 1 and 2, a carriage 30 (specifically, wheeled platform) is used.

The carriage 30 can reciprocate between the spindle device 7 and the mold 50. Preferably, the carriage 30 is constructed to run on rails R laid on the floor. As another example, the carriage 30 may be configured, like an automated guided vehicle, to be able to autonomously travel along a guiding line which is for example buried in the floor.

The carriage 30 is provided with a holder for the rigid core 2, for example, a jig 32 for supporting the horizontally protruding coupling portions 5 from the under side.

The jig 32 supports the rigid core 2 or core-assembly 4 so that the rubber member 3 is spaced apart from the top surface of the carriage 30 so as not to be deformed. The structure of the jig 32 is not essential. For example, a pair of Y-shaped frames 32a can be used.

Further, the transfer of the core-assembly 4 from the spindle device 7 to the carriage 30 may be carried out by the use of a transfer device (not shown).

The carriage 30 is provided with a weighing system for measuring the weight of the core-assembly 4 to obtain the weight of the rubber member 3 to be vulcanization-molded which is included in the core-assembly 4.

The weighing system includes a display device 35 which can numerically indicates the weight of the core-assembly 4 and/or the weight of the rubber member 3. Therefore, it is possible to control the volume of the rubber member 3 during conveying the core-assembly 4 since the volume is associated with the weight of the rubber member 3.

The weighing system comprises a weighing device 34, and a control unit 36 for performing a predetermined operation by using the information obtained by the weighing device 34.

The measuring part (e.g. weighing platform) of the weighing device 34 is disposed on the top of the carriage 30. In this embodiment, the jig 32 is disposed on the measuring part, therefore, by placing the core-assembly 4 to the jig 32, the weight of the core-assembly 4 is measured by the weighing device 34. Preferably, the jig 32 is configured so that the measuring part of the weighing device 34 may undergo the weight of the core-assembly 4 in the vertical direction.

Meanwhile, the weight of the rigid core 2 is usually more than 100 kilograms, whereas the weight of the rubber member 3 to be vulcanization-molded is considerably small. For example, in the case of airless tires for passenger cars, the weight of a tread ring is on the order of several kilograms.

Figure 5:
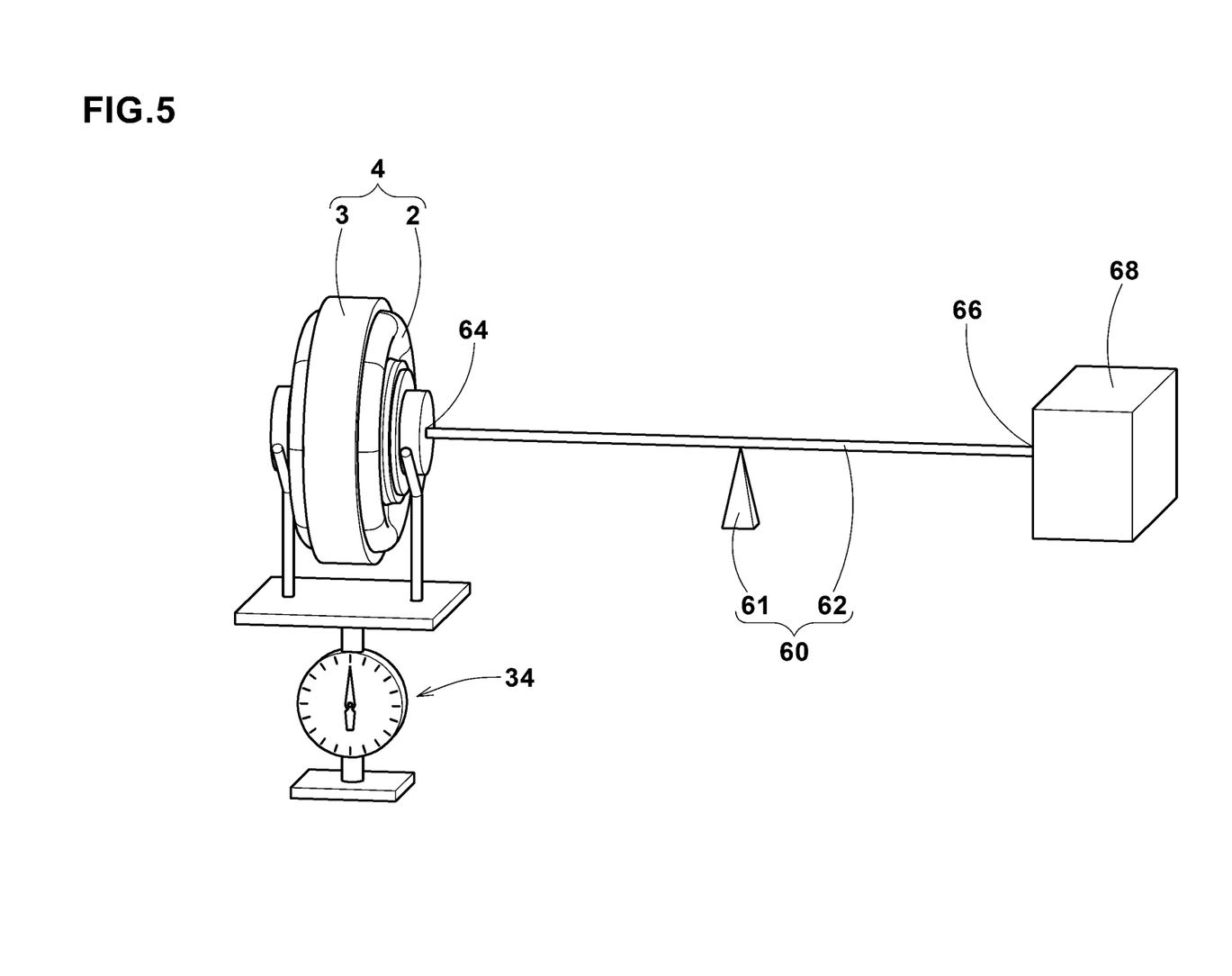
FIG. 5 is a conceptual diagram for explaining another example of the obtaining of the weight of the rubber member of the core-assembly.

Therefore, in order to accurately obtain a small difference of the weight of the rubber member 3 from its target weight, it is possible to use a balancing device 60 in combination with the weighing device 34 in order to reduce the weight to be measured by the weighing device 34.

FIG. 5 conceptually shows the balancing device 60. The balancing device 60 comprises a fulcrum 61 and a balance rod 62 having a first end 64 on which the core-assembly 4 is loaded, and a second end 66 to which a counterweight 68 is attached so as to balance with the rigid core 2. Then, the weight acting on the first end 64 of the balance rod 62 is measured by the weighing device 34. The measured weight is input to the control unit 36 as that of the rubber member 3. In this case, only the weight of the rubber member 3 is loaded on the weighing device 34, therefore, it is possible to use a compact and inexpensive weighing device 34.

Nevertheless, the weighing system may be constructed without the balancing device 60. In this case, the weighing device 34 is measures the weight of the core-assembly 4. The measured weight 4 is input to the control unit 36. The control unit 36 subtracts the known weight of the rigid core 2 from the measured weight of the core-assembly 4 to obtain the weight of the rubber member 3.

In either case, the weight of the rubber member 3 may be indicated numerically by the display device 35, alone or together with the weight of the core-assembly 4.

Further, the control unit 36 is configured to judge whether the weight of the rubber member 3 is within a predetermined allowable range or not.
If the weight is outside the allowable range, the control unit 36 calculates a difference of the weight of the rubber member 3 from the target weight within the allowable range. The calculated difference is indicated by the display device 35 in real time, alone or together with the weight of the rubber member 3 and/or the weight of the core-assembly 4.

Thus, according to the excess or deficiency of the weight displayed on the display device 35, a worker can remove a portion of the rubber of the rubber member 3, or add rubber to the rubber member 3—a step of adjusting the weight.

Thus, prior to vulcanization-molding, it is possible to properly manage the weight (i.e., volume) of the rubber member 3 to be vulcanization-molded and thus the rubber member 3 can be manufactured with high accuracy by preventing molding defects.

It is preferable that a working station 40 for performing the step of adjusting the weight is provided in the middle of the pathway for the carriage 30.

In the working station 40, additional unvulcanized rubber pieces 42 having different weights are prepared in advance so that the worker can select one or more rubber pieces 42 whose total weight becomes equal or close to the deficiency of the weight displayed on the display device 35.

The additional unvulcanized rubber pieces 42 are preferably made of a material same as the material which forms an outer surface of the rubber member 3 to which the additional rubber piece 42 is applied in order to adjust the weight. The additional rubber piece 42 is preferably in the form of a sheet having a thickness of about 0.5 to 2.0 mm.
In the tire axial direction, the width of the additional rubber piece 42 is less than the width of the rubber member 3 and more than 5 mm for example.

If the weight of the rubber member 3 is under the allowable range, the weight of the rubber member 3 is increased by applying the rubber piece(s) 42 to the outer surface of the rubber member 3.

If the weight of the rubber member 3 is over the allowable range, the weight of the rubber member 3 is decreased by removing a portion of the unvulcanized rubber of the rubber member 3. In either case, again the weight of the rubber member 3 is measured by the weighing device 34, and the control unit 36 judges whether the weight of the rubber member 3 is within the predetermined allowable range or not. The result is displaced on the display device 35. Such operation is repeated until the rubber member 3 becomes a proper weight.

As described above, the weight of the rubber member 3 of the core-assembly 4 is obtained during converging the core-assembly 4. As a result, it is possible to remove the core-assembly 4 from the spindle device 7 immediately after the preparing step is completed, and attach another rigid core 2 to the spindle device 7 to prepare another core-assembly 4. Therefore, it is possible to reduce the time when the spindle device 7 is occupied by one rigid core 2, which shorten the cycle time required for manufacturing the products and improves the productivity.

Figure 4:
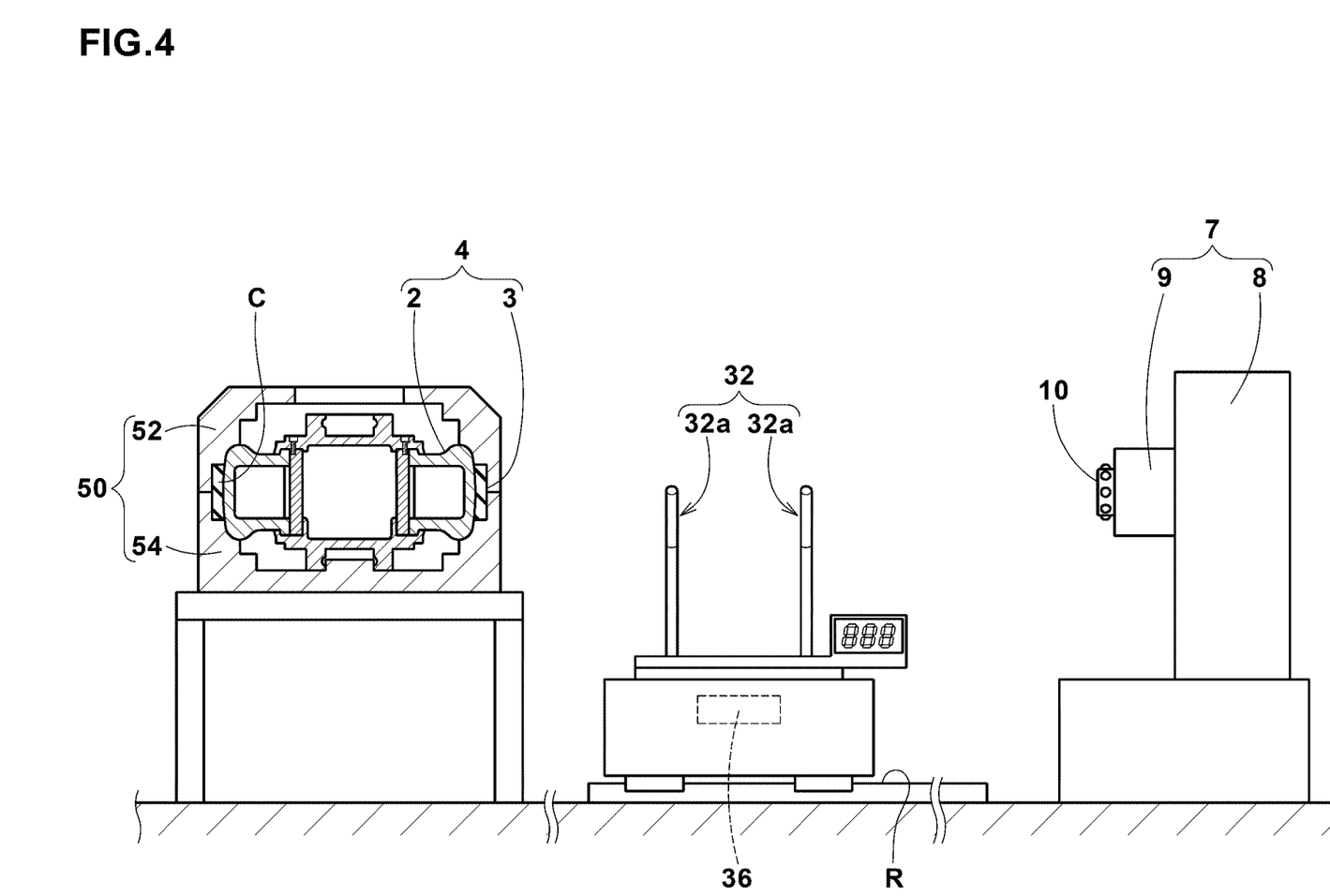
FIG. 4 is the side view of the manufacturing apparatus for explaining the step of vulcanization-molding in the embodiment of the present invention.

In the step of vulcanization-molding the rubber member 3, as shown in FIG. 4, the core-assembly 4 is set in the mold 50 and the rubber member 3 thereon is vulcanization-molded.

The mold 50 in this example is a split mold composed of an upper die 52 and lower die 54.
By an actuator (not shown), the upper die 52 can be moved up and down relatively to the lower die 54 so that the mold 50 is opened (FIG. 1) and closed (FIG. 4).
In the closed state, the cavity C for molding the rubber member 3 is formed between the rigid core 2 and the mold 50.
By heating the rigid core 2 and the mold 50 with a heater and/or heat medium (not shown), the rubber member 3 is vulcanization-molded.

Upon completion of the vulcanization-molding, the mold 50 is opened, and the core-assembly 4 (namely, the rigid core 2 and the vulcanized rubber member 3 thereon) is taken out from the mold 50. Then, by disassembling the rigid core 2, the vulcanized rubber member 3 is separated therefrom.

The rubber member 3 which is a tread ring in this embodiment is assembled with spokes and a hub, and an airless tire is manufactured.

While detailed description has been made of preferable embodiments of the present invention, the present invention can be embodied in various forms without being limited to the illustrated embodiments. For example, the tire may be a pneumatic tire instead of an airless tire.

Comparison Test

Based on the method as described above, 100 pieces of a tread ring for an airless tire were manufactured.

Further, as a comparative example, 100 pieces of a tread ring were manufactured without obtaining and adjusting the weight of the rubber member. (corresponding tire size 115/90-13, Target weight 4.8 Kg, Allowable range +/−40 g)

As a result, it could be confirmed that the cycle time required for manufacturing the tread rings was reduced by 5% in the method according to the invention when compared with the comparative example.

Further, in the comparative example, the defective occurrence rate was 15%, whereas the defective occurrence rate was 0% in the method according to the invention.

REFERENCE SIGNS LIST 1 manufacturing apparatus
2 rigid core
3 rubber member to be vulcanization-molded
4 core-assembly
7 spindle device
30 carriage
32 jig
34 weighing device
35 display device
36 control unit
40 working station
50 mold
60 balancing device
62 balance rod
64 first end
66 second end
68 counterweight

The invention claimed is:

1. A method of manufacturing a tire product comprising the steps of:
  attaching a rigid core to a spindle device,
  preparing a core-assembly of a rigid core and a rubber member formed on the rigid core, wherein the rubber member is to be vulcanization-molded and constitutes all or a portion of a green tire, and wherein the rubber member is wound on an outer surface of the rigid core, while rotating the rigid core with the spindle device,
  transferring the prepared core-assembly from the spindle device to a carriage, wherein the carriage is constructed to run on rails,
  conveying the core-assembly from the spindle device to a mold by using the carriage running on the rails,
  obtaining a weight of the rubber member on the carriage,
  transferring the core-assembly from the carriage to the mold and placing the rigid core in the mold together with the rubber member, and
  vulcanization-molding the rubber member on the rigid core in the mold,
wherein
  the obtaining of the weight of the rubber member includes:
  using a weighing system,
  wherein the weighing system comprises a balancing device and a weighing device, and wherein the weighing device is disposed on the carriage together with a display device indicating a weight measured thereby, and the weighing device is provided with a holder supporting the conveyed core-assembly, and
  the balancing device comprises a balance rod having a first end on which the core-assembly is loaded, and a second end to which a counterweight balancing with the rigid core is attached so that the weighing device receives a part of the weight of the core-assembly which part corresponds to the weight of the rubber member, and
  loading substantially only the weight of the rubber member on the weighing device by using the balancing device in advance of measuring, and
  measuring the weight of the rubber member.

2. The method of manufacturing the tire product according to claim 1, wherein
  the conveying of the core-assembly further includes
  determining whether the obtained weight of the rubber member is within a predetermined allowable range or not, and
  adjusting the weight, when the obtained weight is outside the allowable range, by adding rubber to the rubber member when the weight is under the allowable range, ° rand by removing rubber from the rubber member when the weight is over the allowable range whereas when the obtained weight is within the allowable range, the adjusting of the weight is not made.

3. The method of manufacturing the tire product according to claim 2, wherein
  the outer surface of the rigid core extends circumferentially around the rotational axis of the rigid core,
  the rigid core is provided on each side in the axial direction with a coupling portion which protrudes axially outwardly,
  the holder supports the coupling portions which protrude horizontally, from the underside thereof, and
  the carriage is movable on the rails between the spindle device and the mold.

* * * * *